US008845819B2

United States Patent
Gebhardt et al.

(10) Patent No.: US 8,845,819 B2
(45) Date of Patent: Sep. 30, 2014

(54) SYSTEM FOR REDUCING DEPOSITS ON A COMPRESSOR

(75) Inventors: Eric Gebhardt, Roswell, GA (US);
Rahul J. Chillar, Marietta, GA (US);
Dale J. Davis, Marietta, GA (US)

(73) Assignee: General Electric Company, Schenectady, NY (US)

( * ) Notice: Subject to any disclaimer, the term of this patent is extended or adjusted under 35 U.S.C. 154(b) by 950 days.

(21) Appl. No.: 12/189,900

(22) Filed: Aug. 12, 2008

(65) Prior Publication Data
US 2010/0037924 A1    Feb. 18, 2010

(51) Int. Cl.
*B08B 3/00*    (2006.01)
*B08B 3/02*    (2006.01)
*F01D 25/00*   (2006.01)
*F02C 3/30*    (2006.01)
*F02C 7/00*    (2006.01)
*F04D 29/70*   (2006.01)

(52) U.S. Cl.
CPC ............... *F02C 3/30* (2013.01); *F01D 25/007* (2013.01); *F05D 2270/08* (2013.01); *F01D 25/002* (2013.01); *F05D 2260/95* (2013.01); *F05D 2260/212* (2013.01); *F04D 29/705* (2013.01)
USPC ....... 134/115 R; 134/117; 134/137; 134/138; 134/139; 134/140; 134/141; 134/143; 134/144; 134/146; 134/147; 134/148; 134/151

(58) Field of Classification Search
CPC ....... F01D 25/002; F01D 25/007; F02C 3/30; F04D 29/705; F05D 2260/95; F05D 2260/212; F05D 2270/08
USPC ............................................. 134/115 R, 123
See application file for complete search history.

(56) References Cited

U.S. PATENT DOCUMENTS

| | | | | | |
|---|---|---|---|---|---|
| 2,595,490 | A | * | 5/1952 | Schubring et al. | 122/459 |
| 2,919,070 | A | * | 12/1959 | Arant | 239/10 |
| 4,015,618 | A | * | 4/1977 | Schmid | 137/93 |
| 4,059,123 | A | * | 11/1977 | Bartos et al. | 134/102.2 |
| 4,808,235 | A | * | 2/1989 | Woodson et al. | 134/22.19 |
| 5,011,540 | A | * | 4/1991 | McDermott | 134/23 |
| 5,076,855 | A | * | 12/1991 | Kaes | 134/2 |

(Continued)

FOREIGN PATENT DOCUMENTS

| | | | | |
|---|---|---|---|---|
| DE | 1 951 356 | * | 12/1978 | |
| EP | 1375866 A2 | * | 1/2004 | F02C 7/08 |

(Continued)

OTHER PUBLICATIONS

European Patent Office 1 375 866 Jan. 2004.*

(Continued)

*Primary Examiner* — Joseph L Perrin
*Assistant Examiner* — Levon J Shahinian
(74) *Attorney, Agent, or Firm* — Ernest G. Cusick; Frank A. Landgraff

(57) ABSTRACT

An embodiment of the present invention provides a water wash system that may mix a cleaning fluid with at least one chemical agent to form a cleaning solution. The cleaning solution may reduce the corrosives on components of a compressor. The cleaning solution may be an mildly acidic solution to reduce corrosion of a caustic nature. Alternatively, the cleaning solution may be a mildly basic solution to reduce corrosion of an acidic nature.

14 Claims, 2 Drawing Sheets

(56) References Cited

U.S. PATENT DOCUMENTS

| | | | |
|---|---|---|---|
| 5,193,976 A * | 3/1993 | Kolev et al. | 415/116 |
| 5,425,815 A * | 6/1995 | Parker et al. | 134/26 |
| 6,073,637 A * | 6/2000 | Hayward et al. | 134/22.1 |
| 6,310,022 B1 * | 10/2001 | Amiran | 510/185 |
| 6,491,048 B1 * | 12/2002 | Foster | 134/169 A |
| 7,162,354 B2 * | 1/2007 | Takada et al. | 701/100 |
| 7,428,906 B2 * | 9/2008 | Asplund et al. | 134/22.1 |
| 7,531,048 B2 * | 5/2009 | Woodcock et al. | 134/34 |
| 7,571,735 B2 * | 8/2009 | Wagner | 134/198 |
| 2004/0001751 A1 * | 1/2004 | Poccia et al. | 415/116 |
| 2007/0000528 A1 * | 1/2007 | Asplund et al. | 134/166 R |
| 2007/0028947 A1 * | 2/2007 | Erickson et al. | 134/22.18 |
| 2007/0059159 A1 * | 3/2007 | Hjerpe | 415/117 |
| 2008/0078422 A1 * | 4/2008 | Wagner | 134/22.1 |
| 2009/0084411 A1 * | 4/2009 | Woodcock et al. | 134/22.18 |
| 2009/0235954 A1 * | 9/2009 | Lakdawala et al. | 134/18 |

FOREIGN PATENT DOCUMENTS

| | | | |
|---|---|---|---|
| JP | 06-058172 | * | 3/1994 |
| JP | 07-279613 | * | 10/1995 |
| JP | 2000-274206 | * | 10/2000 |

OTHER PUBLICATIONS

Amamiya, "JP07279613A English Machine Translation.pdf", Oct. 27, 1995—Machine translation from PAJ.*

* cited by examiner

SYSTEM FOR REDUCING DEPOSITS ON A COMPRESSOR

BACKGROUND OF THE INVENTION

The present invention relates generally to a turbomachine; and more particularly to a water wash system for cleaning the compressor of a turbomachine.

Some turbomachines, such as, but not limiting of, gas turbines, and aero-derivatives, have an air inlet system that channels the incoming airstream towards a compressor. The inlet system usually has a filter section, which screens the airstream of foreign objects and other undesired materials. Typically, the inlet system and the compressor are created out of metals that may corrode due to the environment (ambient conditions, etc) in which the turbomachine operates. These turbomachines may develop microenvironments related to the ambient conditions in which the turbomachine operates. These microenvironments, which have accelerated airflows and pressures, typically increase the corrosion rate of the components of the compressor.

Water wash systems are commonly used to remove the contaminants and reduce the corrosives on the compressor of the turbomachines. Some water wash systems operate while the turbomachine operates. These are commonly referred to as "on-line" water wash systems.

On-line water wash systems typically use de-mineralized water (hereinafter "de-min water") to clean the compressor. However, a cleaner stronger than de-min water is required to reduce or eliminate some corrosives.

For the foregoing reasons, there is a need for a water wash system that can use more than de-min water to clean the compressor. The system should use a cleaning solution that yields a stronger cleaning result on than that of de-min water.

BRIEF DESCRIPTION OF THE INVENTION

In an embodiment of the present invention, a water wash system for a turbomachine comprising an inlet plenum and a compressor, the water wash system comprising: a plurality of nozzles positioned within the inlet plenum; a first tank for storing a cleaning fluid used by the water wash system; and a second tank for storing at least one chemical agent used by the water wash system; wherein the water wash system mixes the at least one chemical agent with the cleaning fluid to create at least one cleaning solution which is moved through the plurality of nozzles towards the compressor; and wherein the cleaning solution can reduce a level of corrosives on the compressor.

In an alternate embodiment of the present invention, a system for reducing the corrosives on a compressor of a turbomachine, the system comprising: an inlet system for directing air into the compressor of the turbomachine, the inlet system comprising: an inlet filter house for screening an airstream entering the inlet system; a cooling module for conditioning the airstream within the inlet system; a silencer section for reducing noise within the inlet system; an inlet bleed heat system for conditioning the airstream; and an inlet plenum; and a water wash system comprising: a plurality of nozzles positioned within the inlet plenum; a first tank for storing at least one cleaning fluid used by the water wash system; and a second tank for storing at least one chemical agent used by the water wash system; wherein the water wash system mixes the at least one chemical agent with the cleaning fluid to create a cleaning solution, and pumps the cleaning solution through the plurality of nozzles towards the compressor; and wherein the cleaning solution can reduce corrosives on the compressor.

BRIEF DESCRIPTION OF THE DRAWINGS

These and other features, aspects, and advantages of the present invention will become better understood when the following detailed description is read with reference to the accompanying drawings in which like characters represent like elements throughout the drawings.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

Certain terminology is used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

An embodiment of the present invention provides a water wash system that may mix a cleaning fluid with at least one chemical agent to form a cleaning solution. The cleaning solution reduces the corrosives on components of a turbomachine compressor. The cleaning solution may be an acidic solution to reduce corrosion of a caustic nature. Alternatively, the cleaning solution may be a basic solution to reduce corrosion of an acidic nature. As described below, an embodiment of the present invention may allow for the at least one chemical agent and the cleaning fluid to mix within a first tank prior to flowing through a plurality of nozzles. Also, an alternate embodiment of the present invention allows for the at least one chemical agent and the cleaning fluid to mix in a header located downstream of the first tank.

Figure 1:
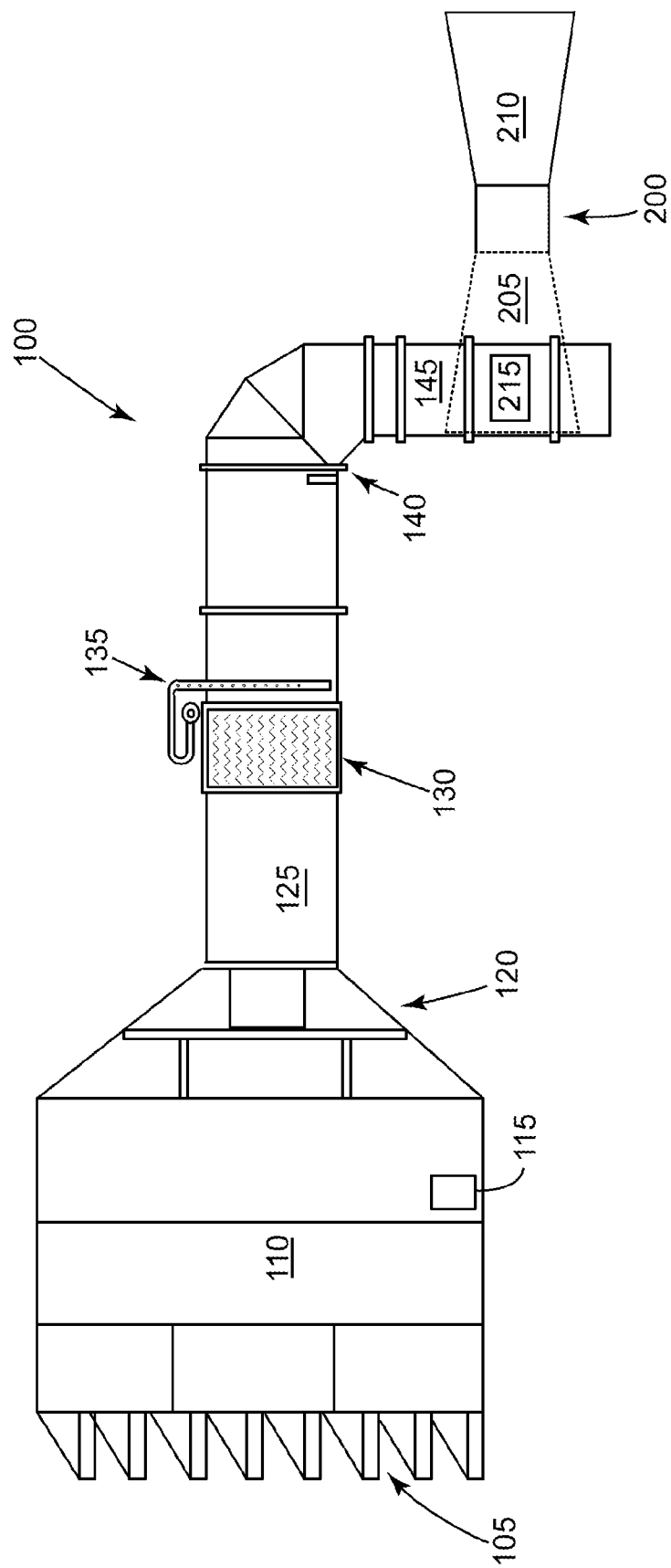
FIG. 1 is a schematic illustrating an environment where an embodiment of the present invention may operate.

Referring now to the Figures, where the various numbers represent like elements throughout the several views, FIG. 1 is a schematic illustrating an environment where an embodiment of the present invention may operate. FIG. 1 illustrates an inlet system 100 that may be integrated with a compressor 205 of a turbomachine 200. During operation of the turbomachine 200, the compressor 205 may become fouled by corrosives elements within the airstream. Also, an operator of the turbomachine 200 may use a water-wash system 215 to clean and reduce the level of corrosion on the compressor 205.

The following description provides an overview of a typical configuration of an inlet system 100. However, the present invention may be used with other configurations of the inlet system 100, which are not illustrated in the Figures. The inlet system 100 channels the airstream drawn in by the compressor 205. The airstream usually comes from the environment in which the turbomachine 200 operates. Initially, the airstream flows around a weather hood 105, which may prevent weather elements, such as rain, snow, etc, from entering the compressor 205. The airstream may then flow through an inlet filter house 110; which generally removes foreign objects and debris from the airstream. Next, the airstream may flow through a cooling module 115. Next, the airstream may flow through a transition piece 120 and an inlet duct 125; these components may adjust the velocity and pressure of the airstream. Next, the airstream may flow through a silencer section 130. Next, the airstream may flow through an inlet bleed heat system 135, which generally increases the airstream temperature prior to entering the compressor 205. A screen 140, or the like, may be located downstream of the inlet duct 125 and generally serves to prevent debris from entering the compressor 205. The inlet plenum 145 may connect the inlet system 100 with the compressor 205.

In an embodiment of the present invention, the water-wash system 215 includes a plurality of nozzles 225 located in and/or adjacent the inlet plenum 145. An embodiment of the present invention may provide a water-wash system 215 that operates while the turbomachine 200 is in normal operation. This may be considered an on-line water-wash system 215.

Figure 2:
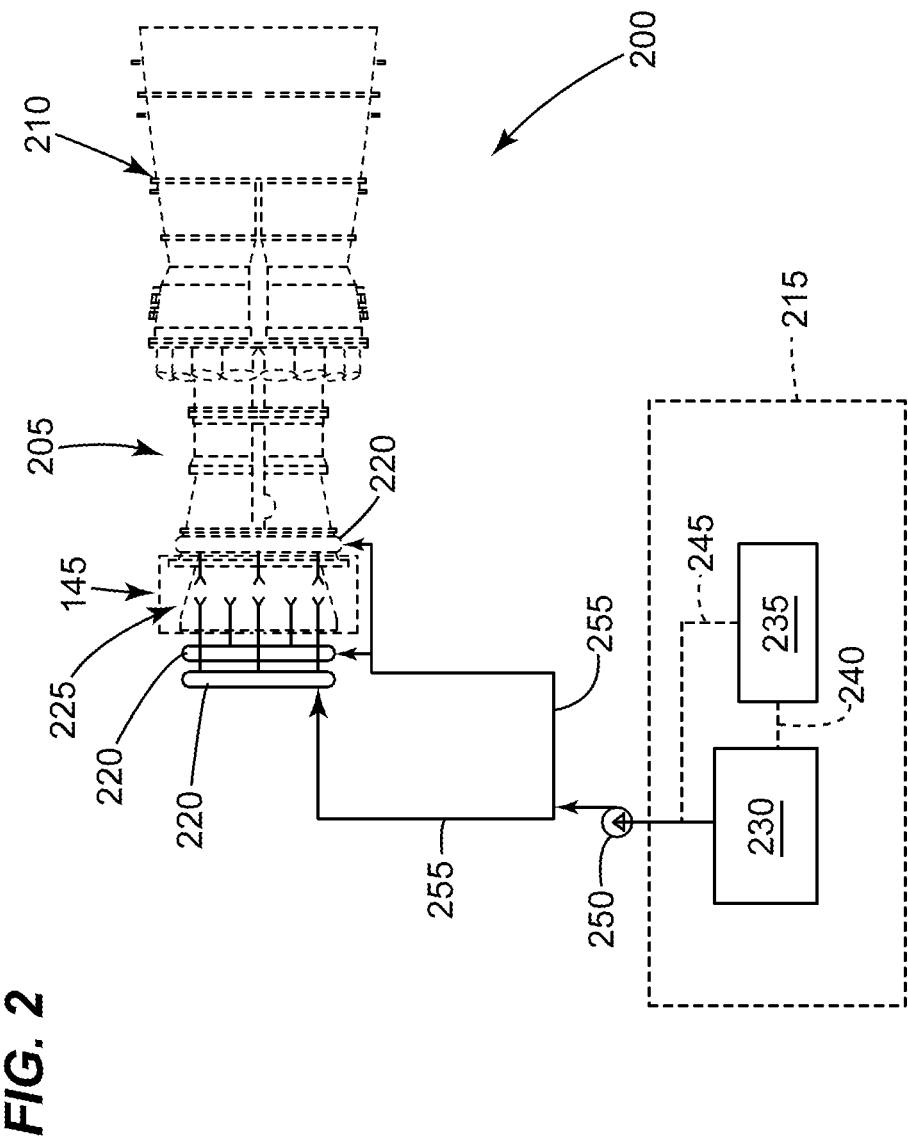
FIG. 2 is a schematic illustrating embodiments of a water wash system, in accordance with embodiments of the present invention.

FIG. 2 is a schematic illustrating an embodiment of a water-wash system 215, in accordance with an embodiment of the present invention. As discussed, the water-wash system 215 may be integrated with the turbomachine 200. In an embodiment of the present invention, the turbomachine 200 comprises a compressor 205 and a turbine section 210. Other components of the turbomachine 200 are shown for illustrative purposes only. The components of the water-wash system 215 may be comprised of a stainless steel, or any other material capable of withstanding the operating environment to which the water-wash system 215 may be subjected.

Generally, on-line water-washing may be considered the process of injecting a cleaning fluid such as, but not limiting of, de-min water into the inlet of the compressor 205, while the turbomachine 200 operates near a synchronous speed. On-line water-washing provides the user with the advantage of cleaning the compressor 205 without shutting down the turbomachine 200. The aforementioned water-wash system 215 components along with various other piping, fittings, valves (none of which are illustrated), may be mounted on, or near, the turbine machine 200.

The embodiments of the present invention may use at least one chemical agent to neutralize the corrosives on the compressor 205. The chemical agent, or agents, may be of a mild strength, making the cleaning solution either mildly acidic or mildly basic. This cleaning solution may neutralize the corrosives and possibly remove some of the corrosive deposits on the compressor 205.

A first embodiment of the water-wash system 215 may comprise at least one manifold 220 with having nozzles 225 attached. A first tank 230 for housing a cleaning fluid, such as, but not limiting of, de-min water; a second tank 235 for storing a chemical agent, such as, but not limiting of, an acidic agent or a basic agent. A direct line 240 allows the contents of the second tank 235 to enter the first tank 230. At least one pump 250 for moving the contents of the first tank 230 and the second tank 235 through the nozzles 225.

The environment that the turbomachine 200 operates may allow for corrosive elements, ingested by the inlet system 100, to deposit of the blades of the compressor 205. These deposits may be either sold or liquid in nature. As the humidity of the airstream increases, the solid deposits, such as, but not limiting of, salts, may absorb moisture from and liquefy, as an acid or base, and cause corrosion on the parts of the compressor 205.

Generally, if the operating environment of the turbomachine 200 is acidic in nature, then the deposits on the compressor 205 may be acidic in nature. These acidic corrosives may include for example, but not limiting of, sulfur oxides or chloride. The inlet filter house 110 may not completely mitigate the effect of these acidic compounds on the compressor 205. An embodiment of the present invention may mix at least one chemical agent with a cleaning fluid, creating a cleaning solution that may reduce the level of corrosive deposits on the compressor 205. Here, the cleaning solution may be considered mildly basic. The cleaning solution may react with the acidic deposits on the compressor 205; neutralizing, and possibly mitigating the corrosion.

In this embodiment, the pH range of the cleaning solution may be from about 7 to about 14. The at least one chemical agent may comprise at least of: sodium hydroxide; caustic soda; calcium hydroxide; ammonium hydroxide; ammonia water; magnesium hydroxide; a bleach; or combinations thereof.

Similarly, if the operating environment of the turbomachine 200 is caustic in nature, then the deposits on the compressor 205 may be caustic in nature. The inlet filter house 110 may not completely mitigate the effect of these caustic compounds on the compressor 205. An embodiment of the present invention may mix at least one chemical agent with a cleaning fluid, creating a cleaning solution for reducing the amount of corrosive deposits on the compressor 205. Here, the clean solution may be considered mildly acidic. The cleaning solution may react with the basic deposits on the compressor 205; neutralizing, and possibly mitigating the corrosion.

In this embodiment, the pH range of the cleaning solution may be from about 1 to about 7. The at least one chemical agent may comprise at least of: hydrochloric acid; sulfuric acid; nitric acid; carbonic acid; uric acid; ascorbic acid; citric acid; acetic acid; tannic acid; tartaric acid; or combinations thereof.

Generally, the water wash system 215 in accordance with embodiments of the present invention may operate as follows. An operator may initiate the on-line water wash system 215. Then a rinse cycle commences; which may only use at least one cleaning fluid from the first tank 230. Next, a wash cycle commences; which may include at least one cleaning solution comprising at least one cleaning fluid and at least one cleaning agent. Next, a second and/or final rinse may commence to rinse away some of the corrosives and the cleaning solution from the compressor 205.

An operator using this first exemplary embodiment of the present invention may have determined that corrosive deposits have fouled the compressor 205. The operator may configure the water wash system 215 to allow for a predetermined amount of the at least one chemical agent in the second tank 235 to enter the first tank 230 via the direct line 240. The operator may utilize a mixer or the like (not illustrated in FIG. 2) to mix the at least one chemical agent with the de-min water, or other cleaning fluid, within the first tank 230; creating the cleaning solution. Next the pump 250 may be operated to move the cleaning solution downstream of the first tank 230 through the header 255, which may be connected to the manifold(s) 220. A first manifold 220 may be located adjacent a forward portion of the inlet plenum 145, and a second manifold 220 may located adjacent an aft end of the inlet plenum 145. Each manifold 220 may have a series of flexible metal piping that connects each manifold 220 to a set of spray nozzles 225. The pump 250 may then drive the cleaning solution through the spray nozzles 225 where the cleaning of the compressor 205 commences. The duration that the water wash system 215 operates generally depends on the nature and severity of the corrosion on the components of the compressor 205.

A second exemplary embodiment of the present invention incorporates a bypass line 245; which may prevent the contents of the second tank 235 from directly entering the first tank 230. Here, the contents of the first and second tanks 230, 235 may mix in the header 255. This embodiment may be beneficial to an operator who does not want residue from the at least one chemical agent to remain within the first tank 230.

An operator using this second embodiment of the present invention may have determined that corrosive deposits foul the compressor 205. The operator may configure the water-wash system 215 to allow for a predetermined amount of the at least one chemical agent in the second tank 235 to enter the header 255 via the bypass line 245. The operator may utilize a mixer, vibration means, or the like (not illustrated in FIG. 2) to mix the at least one chemical agent with the cleaning fluid of the first tank 230, creating the cleaning solution. Next, the pump 250 may be operated to move the cleaning solution to the manifold (s) 220. The pump 250 may then drive the cleaning solution through the spray nozzles 225 where the cleaning of the compressor 205 commences. The duration that the water-wash system 215 operates generally depends on the nature and severity of the corrosion on the components of the compressor 205.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims.

What is claimed is:

1. An online water-wash system comprising:
    a turbomachine comprising an inlet plenum and a compressor;
    an online water-wash system with components permanently connected to the turbomachine, wherein the components of the online water-wash system comprise:
        a plurality of nozzles positioned within the inlet plenum;
        a first tank for storing a cleaning fluid used by the water-wash system; and
        a second tank for storing at least one chemical agent used by the water-wash system;
        wherein the water-wash system mixes the at least one chemical agent with the cleaning fluid to create a cleaning solution which is moved through the plurality of nozzles towards the compressor to engage components of the compressor;
    wherein the online water-wash system operates while the turbomachine operates at approximately a synchronous speed; and wherein components of the online water-wash system are not removed when the online water-wash system is not in operation, further comprising a pumping system, wherein the pumping system comprises a pump and drives the cleaning solution from the water-wash system, through the plurality of nozzles towards the compressor, and wherein the second tank and the first tank are separately connected to a header, and the header of the online water-wash system permits creation of the cleaning solution therein.

2. The system of claim 1, wherein the online water-wash system mixes the cleaning solution to basic to allow for neutralizing acidic corrosives.

3. The system of claim 2, wherein the at least one chemical agent comprises at least one of: sodium hydroxide; caustic soda; calcium hydroxide; ammonium hydroxide; ammonia water; magnesium hydroxide; a bleach; or combinations thereof.

4. The system of claim 1, wherein the cleaning solution is acidic to allow for neutralizing caustic corrosives.

5. The system of claim 4, wherein the at least one chemical agent comprises at least one of: hydrochloric acid; sulfuric acid; nitric acid; carbonic acid; uric acid; ascorbic acid; citric acid; acetic acid; tannic acid; tartaric acid; or combinations thereof.

6. The system of claim 1, wherein the cleaning fluid comprises de-mineralized water.

7. An online water-wash system comprising:
    a turbomachine comprising an inlet plenum and a compressor;
    an online water-wash system with components permanently connected to the turbomachine, wherein the components of the online water-wash system comprise:
        a plurality of nozzles positioned within the inlet plenum;
        a first tank for storing a cleaning fluid used by the water-wash system; and
        a second tank for storing at least one chemical agent used by the water-wash system;
        wherein the water-wash system mixes the at least one chemical agent with the cleaning fluid the water-wash system creating a cleaning solution which is moved through the plurality of nozzles towards the compressor to engage components of the compressor;
        wherein the online water-wash system operates while the turbomachine operates at approximately a synchronous speed; and wherein components of the online water-wash system are not removed when the online water-wash system is not in operation, further comprising a pumping system, wherein the pumping system comprises a pump and drives the cleaning solution from the water-wash system, through the plurality of nozzles towards the compressor, wherein the second tank is connected to the first tank, and allows the at least one chemical agent to mix with the cleaning fluid within the first tank.

8. A system for reducing corrosives, the system comprising:
    a turbomachine comprising an inlet system for directing air into a compressor of the turbomachine, the inlet system comprising:
        an inlet filter house for screening an airstream entering the inlet system; a cooling module for conditioning the airstream within the inlet system; a silencer section for reducing noise within the inlet system;
        an inlet bleed heat system for conditioning the airstream; and an inlet plenum; and
    an online water-wash system with components permanently connected to the turbomachine, wherein the online water-wash system operates while the turbomachine operates at a synchronous speed and the components of the online water-wash system comprise:
        a plurality of nozzles positioned within the inlet plenum;
        a first tank for storing at least one cleaning fluid used by the water-wash system; and
        a second tank for storing at least one chemical agent used by the water-wash system;

wherein the water-wash system mixes the at least one chemical agent with the cleaning fluid the water-wash system creating a cleaning solution, and pumps the cleaning solution through the plurality of nozzles towards the compressor; and wherein the cleaning solution reduces corrosives on the compressor; and wherein components of the online water-wash system are not removed when not in operation, wherein the second tank and the first tank are separately connected to a header, and wherein the at least one cleaning solution is created within the header, further comprising at least one pumping system, wherein the at least one pumping system comprises a pump and drives the at least one cleaning solution through the plurality of nozzles towards the compressor.

9. The system of claim 8, wherein the cleaning solution has a pH range of from about 7 to about 14 allowing for neutralizing acidic corrosives on the compressor.

10. The system of claim 9, wherein the at least one chemical agent comprises at least one of: sodium hydroxide; caustic soda; calcium hydroxide; ammonium hydroxide; ammonia water; magnesium hydroxide; a bleach; or combinations thereof.

11. The system of claim 8, wherein the cleaning solution has a pH range of from about 1 to about 7 allowing for neutralizing basic corrosives on the compressor.

12. The system of claim 11, wherein the at least one chemical agent comprises at least one of: hydrochloric acid; sulfuric acid; nitric acid; carbonic acid; uric acid; ascorbic acid; citric acid; acetic acid; tannic acid; tartaric acid; or combinations thereof.

13. The system of claim 8, wherein the cleaning fluid within the first tank comprises de-mineralized water.

14. A system for reducing corrosives, the system comprising:
a turbomachine comprising an inlet system for directing air into a compressor of the turbomachine, the inlet system comprising:
an inlet filter house for screening an airstream entering the inlet system; a cooling module for conditioning the airstream within the inlet system; a silencer section for reducing noise within the inlet system;
an inlet bleed heat system for conditioning the airstream; and an inlet plenum; and
an online water-wash system with components permanently connected to the turbomachine, wherein the online water-wash system operates while the turbomachine operates at a synchronous speed and the components of the online water-wash system comprise:
a plurality of nozzles positioned within the inlet plenum;
a first tank for storing at least one cleaning fluid used by the water-wash system; and
a second tank for storing at least one chemical agent used by the water-wash system;
wherein the water-wash system mixes the at least one chemical agent with the cleaning fluid the water-wash system creating a cleaning solution, and pumps the cleaning solution through the plurality of nozzles towards the compressor; and wherein the cleaning solution reduces corrosives
on the compressor; and wherein components of the online water-wash system are not removed when not in operation, further comprising at least one pumping system, wherein the at least one pumping system comprises a pump and drives the at least one cleaning solution through the plurality of nozzles towards the compressor, wherein the second tank is connected to the first tank, and allows the at least one chemical agent to mix with the cleaning fluid within the first tank.

* * * * *